Fig.1

INVENTOR.
William Mynard McConnell
BY
Webb, Mackey & Burden
HIS ATTORNEYS

INVENTOR.
William Mynard McConnell

Fig. 11

INVENTOR.
William Mynard McConnell

United States Patent Office 3,095,729
Patented July 2, 1963

---

3,095,729
PIPE TESTER WITH AUTOMATIC SCREW-OFF STATIONS
William Mynard McConnell, Pittsburgh, Pa., assignor to Taylor-Wilson Manufacturing Company, Pittsburgh, Pa., a corporation of Pennsylvania
Filed June 29, 1960, Ser. No. 39,705
18 Claims. (Cl. 73—49.1)

The present application relates to closure screw-off apparatus for unplugging a threaded pipe at opposite ends following pressure testing the pipe with its ends closed. My apparatus is primarily adapted for use as the automatic screw-off stations in hydrostatic pipe test equipment and preferably in field test equipment of that type as now employed; i.e., the tester used in a pipe mill which simulates actual field connections and pressures in the test operation.

A field test operation consists of applying a hollow plug member so as to close one end of a length of pre-threaded pipe following manufacture, charging the pipe with water by filling through the open end, capping that end with a threaded cap member so as to close it and keep out air, and introducing predetermined high pressure water through the hollow interior of the plug member so as to internally hydraulically stress the pipe for detecting the defects through leakage. After the success or failure of the pipe is established, the operation is completed by removal of the closure members one at each of the opposite ends, enabling the water to empty from the pipe whereupon the pipe is removed.

Automatic operation has not proved too feasible because of several existing drawbacks. One drawback attendant with the removal of end closure members is their head-heavy irregular shape, making it a difficult operation to accomplish if not accomplished manually. Moreover, the cap closure member is differently shaped from and has internal threads therein compared with the above referred to plug closure member, the latter having an externally threaded head introducing the further drawback of added precautions being necessary to prevent spoiling the exposed threads. It can thus be seen that while the problem of closure member removal hereof will have several things in common at opposite ends of the pipe member, there is nevertheless no rigid pattern of uniformity that can be relied upon when it comes to working out the details of removing the cap at one end compared to removal of the plug at the other.

Apparatus which comprises my invention overcomes the foregoing drawbacks as will now be explained, resulting in testing and then removing from each passing length of plugged pipe tested, the individual end closure members automatically and keeping these closure members in constant reuse as they become available from the pipe, each for recirculation in a fresh length of untested pipe. Various features, objects and advantages will either be specifically pointed out or become apparent when, for a better understanding of the invention, reference is made to the following explanatory description taken in conjunction with the accompanying drawings which show certain preferred embodiments hereof.

Figure 1:
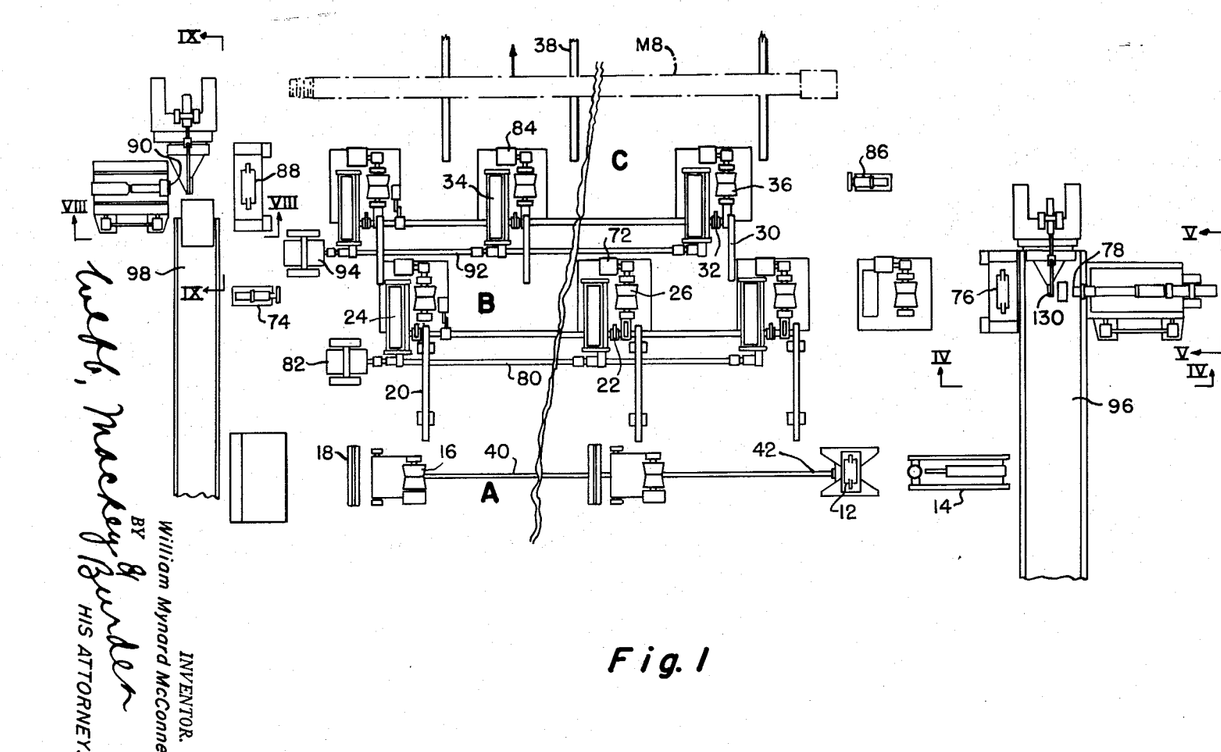
FIGURES 1 and 2 are plan and end elevational views respectively of a pipe field tester embodying automatic screw-off apparatus according to the present invention.
Figure 2:
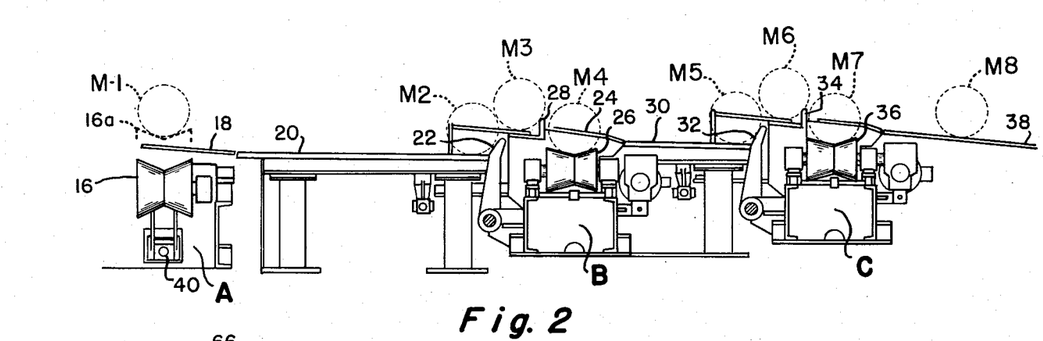

More particularly, the apparatus of FIGURES 1 and 2 includes a set of pipe roll stands A, a set of pipe roll stands B, and a set of pipe roll stands C arranged in alignment in a row extending lengthwise of the apparatus. The stands A constitute a pipe roll line for serving a pipe gripper 12 and a test head mechanism 14 constituting the main tester station in the apparatus.

The row of stands of the tester as a whole may be many feet long and the stands themselves are preferably of a size to accommodate 40-foot pipe members or longer ones, and with outside diameters up to about 13 inches.

Following the test, each pipe member is kicked out of the stands A incident to depressing the rolls 16 thereof, each of which is supported by means of a pivoting roll frame which carries kick out plates 18 in opposing relation to the companion rolls 16. Thus, as each roll is depressed downwardly from its dotted line elevated position shown by the dotted lines 16a in FIGURE 2, into the solid line position there shown, the pipe member occupying the position M1 supported thereby transfers onto the rising kickout plate 18 so as to transfer therealong and along the sloping feed skids 20 by gravity to a position M2 where it rolls into engagement with a stop 22 (FIGURE 2) on the feed side of the stands B.

A combined set of flipper plates 24 on the stands B (FIGURE 2) operates to raise the pipe member from the position M2 at the same time the set is operating to raise a pipe member from the position M4 occupying the rolls 26 on the stands B. The sloping upper surface of these combined plates 24 is divided by a narrow stop 28 so that in their upraised position, one pipe member thereon will advance to but not pass beyond the position M3 whereas the other pipe member rolls on a set of sloping skids 30 into the position M5 engaging a stop 32 mounted adjacent the feed side of the stands C. After a momentary time delay period, the combined flipper plates 24 are returned to their unpivoted position enabling the pipe member in the position M3 to advance by gravity to the position M4 on the rolls 26 for a plug screw-off operation.

A similar set of combined flipper plates 34 (FIGURE 2) operates to move a pipe member through the consecutive positions M5 and M6 into a cap screw-off position M7 where it is supported by a set of rolls 36 on the stand C. At the same time a length of unplugged pipe has been introduced by the plates 34 onto a set of run off skids 38 where, from the position shown by the dotted lines M8, the pipe rolls sidewise by gravity to an inspection point on storage skids (not shown).

At the stands A, a length of reciprocatable power shafting 40 is connected in common to the frames supporting the rolls 16 so as to oscillate these roll frames for producing the kickout motion previously referred to.

The gripper 12 retains its grip on the pipe member after the operation of the test head mechanism 14 is completed whereupon a positioning cylinder rod 42 connected to the gripper 12 is operated so as to withdraw the pipe member in the endwise direction leftwardly as viewed in FIGURE 1 to a prealigned position on the rolls 16 ready to be kicked out and moved to the stands B. At this point, the gripper 12 is deactivated so as to unclamp the pipe member.

Figure 3:
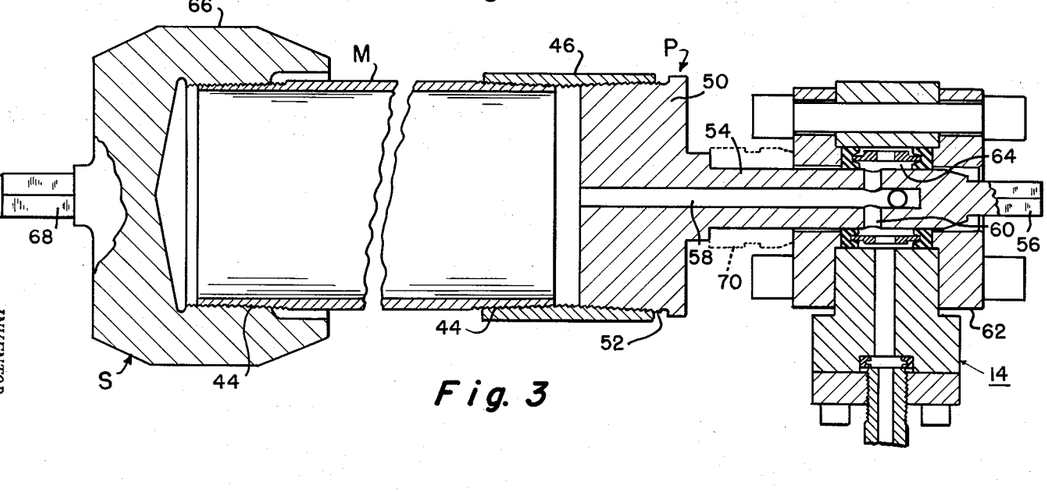
FIGURE 3 is a longitudinal sectional view of one of the tested pipe members during testing but prior to unplugging.

In FIGURE 3, the pipe member indicated by the general reference numeral M consists of a finished length of pipe having external pipe threads 44 at the opposite ends and carrying a separate pipe coupling 46 at one of those ends. The captive coupling 46 carried by the pipe member saves installation time in the field. In the case of some pipe, the coupling is manufactured integral therewith whereas, as illustrated, it is formed as a separate piece and threaded thereon in the pipe mill at a coupling attaching station, not shown, in the tester.

The plug although shown in its screwed together position in FIGURE 3, and indicated by the general reference numeral P, can readily be visualized as constituting a head-heavy affair due to its enlarged head end 50 which is threaded with outside pipe threads 52 of a strengthened form and which complicates the over-all plug shape because of the substantially differing diameters presented at opposite ends of the plug P. The smaller end consists of an elongated round shank 54 which at its extremity is machined with a square cross section 56 to receive a tool. It is screwed into the coupling with power wrench apparatus. A longitudinally extending passage 58 in the plug provides it with a centrally hollow interior which communicates with transverse induction passages 60 located in the elongated shank 54.

When the plug threads 52 seat tightly in the coupling 46 of FIGURE 3, the enlarged head 50 of the plug forms a water-tight closure member at the end of the pipe member. The shank 54 receives the adapter 62 of the test head mechanism 14 having an annular passage 64 registering with the induction passages 60 so as to enable the interior of the pipe member M to have high test pressure introduced from that end.

The opposite end of the member M is preferably the one used by which it is prefilled with water and prior to testing it is covered with a water-tight closure member consisting of a screw-on cap S. The screw-on cap S constitutes a head-heavy affair when separate due to its enlarged pipe covering portion 66 which is threaded with internal pipe threads of a strengthened form and which complicates the overall cap shape because of the substantially differing diameters presented at opposite ends of the cap. The smaller end consists of a shank which for its major portion is machined with a square cross section 68 to receive a tool.

After testing in FIGURE 3, the pipe member M is axially withdrawn from the adapter 62 of the test mechanism whereupon a spacer sleeve 70 is removed whose primary position and operative purpose does not appear here and hence will not be discussed.

In the roll stands B of FIGURE 1, the rolls 26 are electrically driven by means of reversible motors 72 individual thereto where are operatively connected to reciprocate the pipe members by rolling them on the rollers 26 endwise first away from a prealignment stop 74 so as to move toward a gripper 76 and a plug shank tool 78 constituting a plug screw-off mechanism station. Following screw-off, the motors 72 roll the pipe member in the opposite direction endwise to a prealigned position conveyed against the stop 74. The pipe member is then kicked out by the combined kick-in kick-out flipper plates 24 which are pivoted in response to reciprocation of a common shaft 80 operated by a power cylinder 82 (FIGURE 1).

A set of similar reversible motors 84 operates the rolls 36 of the roll stands C as a reciprocating conveyor to move an unplugged pipe member first away from a prealignment stop 86 in the endwise direction toward a gripper 88 and a cap shank tool 90 which constitute a cap screw-off mechanism station. A reciprocating shaft 92 common to the flipper plate 34 of the stands C is operated by a power cylinder 94 to pivot the plates to their elevated position which is held only momentarily and then the shaft 92 returns them to the unpivoted position.

In order to expedite reuse of the closure members, closure member return means disposed one at each side of the row of stands in FIGURE 1 are provided consisting of separate belt conveyors 96 and 98 extending lengthwise of the row for respectively conveying plugs from the plug screw-off mechanism station and conveying caps from the cap screw-off mechanism station, both in the common opposite direction of movement from the pipe members being operated on and handled at those stations. The conveyor 96 delivers the plugs to an anteriorly located, automatic screw-on station comprising power wrench apparatus disclosed in my copending application aforesaid and the conveyor 98 similarly delivers the caps to an automatic screw-on station for caps.

Figures 4, 5:
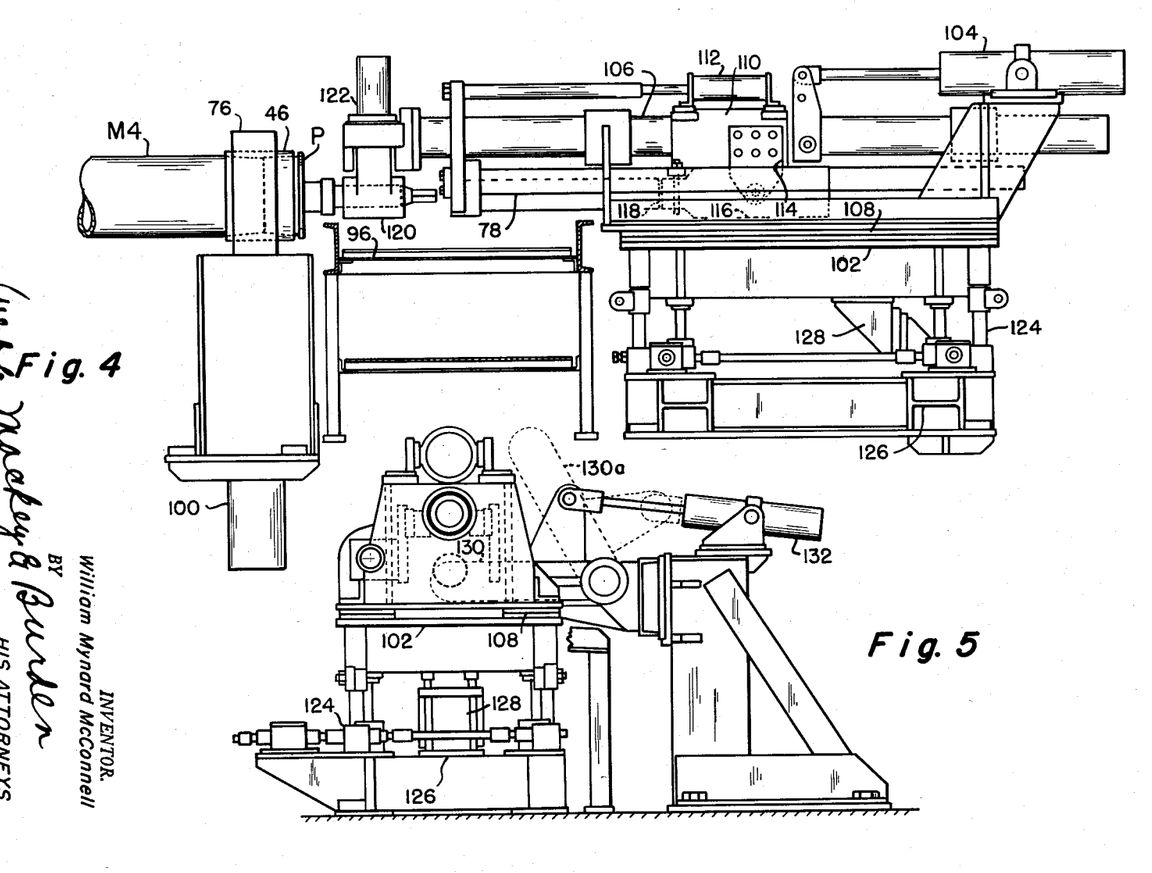
FIGURES 4 and 5 show the mechanism at the plug screw-off station in side elevation and in end elevation respectively as viewed from the direction of the lines IV—IV and V—V of FIGURE 1.

In FIGURE 4, when the pipe member occupies the position M4 for screw-off operation on the roll stands B (not shown), the plug P protrudes with the shank in an overhanging position and the gripper 76 forthwith clamps the coupling 46 so as to hold the pipe member axially fast and also fast against rotation. The gripper 76 is of conventional bipartite jaw construction and is supported on a fixed stand which also supports a gripper operating cylinder 100 for clamping and unclamping the coupling of a pipe member in the gripper jaws. The gripper stand is at one side of the plug belt conveyor 96 whereas a plug wrench stand which provides a platform 102 for handling the plug by the shank 54 is located on the opposite side of the conveyor.

A hydraulic cylinder 104 on the stand platform 102 is connected to reciprocate a bar carriage 106 which is supported by means of runners 108 on the stand platform 102. A slide 110 on the bar of the bar carriage 106 has a push-out cylinder 112 constituting a piston and cylinder connection to the bar for sliding the slide 110 relative thereto and carries a depending bracket 114. The bracket 114 pivotally supports an air-operated impact wrench 116 which is coupled at 118 to drive the tool 78 rotatively and which, due to the push-out cylinder 112, is rendered capable of limited movement with the slide relative to the bar carriage 106.

At the projecting end of the bar of the bar carriage 106, the bar carries a plug shank gripper 120 which is operated by a hydraulic gripper cylinder 122 and the jaws of which support the shank of a plug for rotation but hold it axially fast so as to prevent the plug from separating therefrom when clamped.

In FIGURE 5, as augmented by FIGURE 4, a coordinated screw jack mechanism 124 is shown which connects the platform 102 of the plug wrench stand with the base 126 of that stand. A set of vertical guides 128 keeps the platform 102 in substantial vertical alignment with the stand base 126 as the screw jacks are adjusted upwardly and downwardly to accommodate different diametered pipe members M. A pipe stop is pivoted from the dotted line position 130a into the solid line position shown at 130 by means of an air operated stop cylinder 132 so as to encounter and stop a plug member at the shank end as it advances endwise with the pipe member M. The stop cylinder 132 then returns the stop to the unpivoted position shown by the dotted lines 130a, leaving the pipe member in the position M4 of FIGURE 4 with the path clear for the advancement of the bar carriage 106 on the runners 108.

Figure 6:
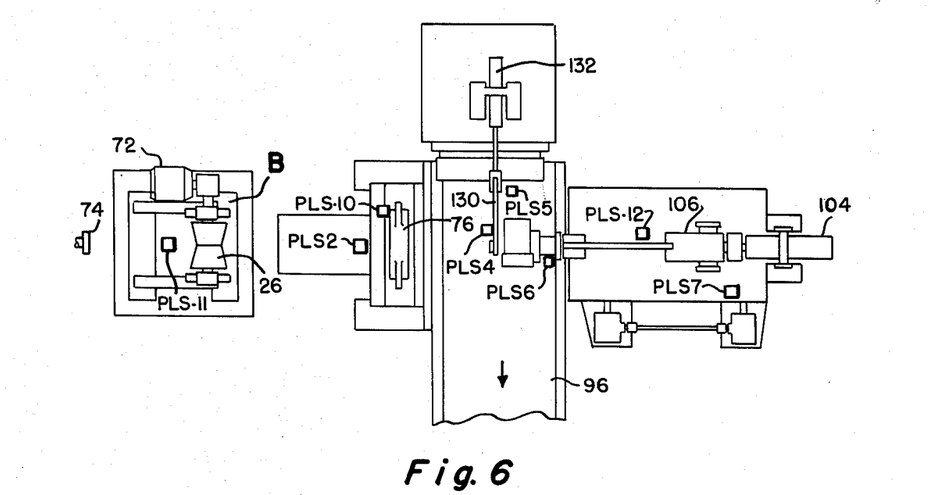
FIGURE 6 shows a plan view like FIGURE 1 but differing therefrom in omitting all but the plug screw-off station mechanism, in being presented to somewhat larger scale and schematically so, and in indicating specific locations for various automatic limit switches on the mechanism.

Each step in the use of the present plug screw-off apparatus of FIGURES 1–5 can, if desired, be separately actuated or manually performed. It is preferred, however, to join the operation of all of the steps by properly placed limit switches according to FIGURE 6 hereof and by control circuits and timing circuits positioned about the apparatus and actuated as follows, it being understood that the pipe stop 130 occupies the pivoted solid line position of FIGURES 1 and 5 necessitating preliminarily moving the plug screw-off mechanism from the solid line position of FIGURE 4 into the retracted position shown at the plug screw-off mechanism station according to FIGURE 1:

I

A tested pipe member is kicked out from the position M1 from the stands A of FIGURE 2 following testing, rolling along the feed skids 20 to the stop position M2. At the start in feeding the pipe member for the first time onto the stands B, the flipper plate mechanism 24 is operated by a push button switch having a pipe-actuated switch PLS11 (FIGURE 6) electrically in parallel therewith and physically located adjacent the prealignment stop 74 of the pipe roll line carried by the stands B. These two parallel connected switches cooperate in the same circuit so that after the first pipe member is handled and brought against the stop 74 by the apparatus, its operation is thereafter automatically actuated as later described, it being understood that the table roll motors 72 are temporarily reversely operating to convey a pipe member in the direction of the prealignment stop 74.

This circuit:

(a) Deenergizes the reverse drive of the roll drive motors 72;

(b) Operates an instantaneously closed, delayed opening set of valve solenoid contacts which control fluid to the hydraulic cylinder 82 so as to pivot and retain the flipper plates 24 upwardly for a short timed interval and then return same to their unpivoted position thus kicking out an unplugged pipe member from the stands B and kicking in a plugged pipe member onto the stands B; and, with the ending of said timed interval, (c) Energizes the forward roll drive of the motors 72 for the drive rolls 26 to drive the plugged pipe member on them forwardly at their fast speed.

II

The leading end of the pipe member on the rolls 26 (FIGURE 6) covers a switch PLS2 and shortly trips and releases a switch PLS4 momentarily which is carried by the stop 130 mechanically in line with the switch PLS2 and which is electrically in circuit with another switch PLS7 hereinafter described. The latter circuit, among other things, clamps the gripper 76 on the pipe member by operating the gripper cylinder 100 (FIGURE 4) in response to said switch PLS4. According to FIGURE 7 the switch PLS2 in being covered closes a lower set of contacts thereof energizing a circuit 134 appearing in the middle of the schematic diagram and also closes an upper set of contacts in circuit with the holding contacts a of a relay R6 so as to prepare the holding circuit for that relay, and thusly (a) The circuit 134, which has a connection (not shown) to the roll drive motors 72 slows down the motors and the pipe member to slow speed; and (b) The relay R6 is prepared for self-holding operation.

III

As the jaws of the gripper 76 clamp the coupling of the pipe member, their movement releases a limit switch PLS10 (FIGURE 6) which has valve solenoid contacts controlling fluid to the air operated stop cylinder 132. Release of these contacts forthwith returns the stop 130 to the unpivoted position 130a in FIGURE 5.

IV

In assuming the unpivoted position the pipe stop 130 operates a switch PLS5 having contacts in circuit with the valve solenoid for the air operated impact wrench 116 (FIGURE 4) tnd in circuit with the valve solenoid for the hydraulic cylinder 104 for the carriage 106. These circuits:

(a) Rotate the wrench and the tool 78 slowly in the counterclockwise or unscrewing direction; and (b) Advance the bar carriage 106 on its runners 108.

V

The advancing carriage 106 strikes a switch PLS12 in its path which is electrically in circuit with the instantaneously closed, delayed opening contacts of a timer relay R2 (FIGURE 7) which controls another timer relay R1. The relay R2 is a cycling relay for operating the push-out cylinder 112 (FIGURE 7) through the cycle of a push-out stroke and a retracting stroke which takes only a few seconds; the relay R1 is a recycling relay causing the push-out and retract cycles of the cylinder 112 to be repeated at regular intervals, for example, every 10 seconds. Relay R2 has a normally-closed set of time delay opening, instantaneously closing contacts and the relay R1 has a regular set of open upper contacts a and a lower normally-closed set of time delay opening, instantaneously closing contacts b, which contacts:

(a) Cycle the push-out cylinder 112 making the plug shank tool 78 seek out and attempt to successfully seat itself on the square end section of the shank of a confronting plug; and (b) Keep repeating the cycles at intervals so that if unsuccessful the first time, the slowly rotating tool 78 will eventually work its way into seated driving engagement with the plug to be unscrewed.

VI

The tool 78 in seating on the plug shank strikes a switch PLS6 in circuit with the relay R6 of step II. The contacts a of the relay R6 complete the holding circuit of step II(b) therefor as soon as this relay is energized. Relay R6 has further sets of contacts, all being actuated thereby to do the following:

(a) The contacts a thereof provide the self-holding circuit already referred to.

(b) The contacts b of the relay R6 operate the solenoid R3 to force the hydraulic cylinder 112 to hold its full push-out position, once attained.

Figure 7:
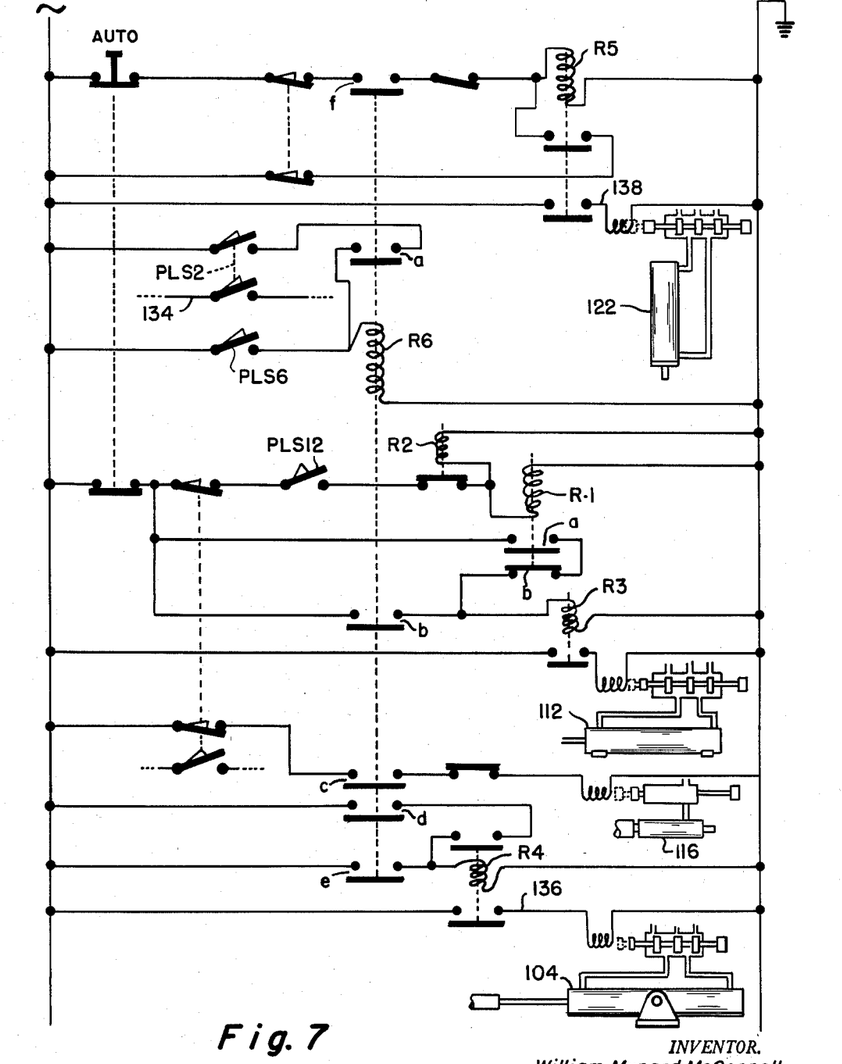
FIGURE 7 is a schematic diagram of a portion of the electrical operating circuit controlled by the limit switches of FIGURE 6.

(c) The contacts c of the relay R6 are valve solenoid contacts which, according to FIGURE 7, control the full-flow, no-flow of fluid to the impact wrench 116 making it forthwith rotate fast in the counterclockwise or unscrewing direction.

(d) The regular contacts d of the relay R6 and the contacts e thereof which are delayed-closing instantaneously-opening contacts, control a carriage cylinder retracting relay R4 (FIGURE 7). The relay R4 has valve solenoid contacts in a circuit 136 for retracting the carriage cylinder 104 from advanced position. This circuit therefore retracts the bar carriage 106 controlled by the carriage cylinder 104 after the time delay interval for the contacts e to close, immediately following closure of contacts d of the relay R6. A delay interval will be selected which slightly exceeds the maximum time necessary for removing a plug P with counterclockwise rotation of the tool 78.

(e) The uppermost contacts f of the relay R6 are instantaneously-opening, delayed-closing contacts controlling a plug gripper relay R5 (FIGURE 7). This relay in response to the timed closure of the contacts f closes a set of contacts in a circuit 138 which, through an appropriate valve solenoid, energizes the plug gripper cylinder 122 to engage a plug being unthreaded from a pipe member.

VII

The retracting bar carriage 106 strikes the limit switch PLS7 (FIGURE 6) of step II above. In addition to the operation of the grippers 76 controlled by the switch PLS7, the operation of the reverse drive of the roll motors 72 is controlled by the switch PLS7 so that as a result of these two operations:

(a) The gripper 76 unclamps the coupling 46 to release the pipe member; and (b) The roll motors 72 operate the rolls 26 on the stands B in a reverse direction to move the unplugged pipe member toward the prealignment stop 74.

VIII

As the jaws of the gripper 76 unclamp the coupling 46 on the pipe member, their movement engages the limit switch PLS10 of step III, the valve solenoid contacts of said switch being immediately closed to pivot the stop 130 to the pipe stopping position ready for the next cycle.

IX

The trailing end of the moving pipe member uncovers the switch PLS2 which opens so as to discontinue holding the relay R6 (FIGURE 7) being energized through the holding circuit including the contacts a of the latter. The relay R6 therefore deenergizes operating the various sets of contacts thereof with the following results:

(a) The contacts b, c, d, and e are dropped out of circuit thus retracting the push-out cylinder 112, stopping the fast rotating wrench 116, and deactivating the relay R4 which has fully performed according to step VI(d).

(b) The contacts f of the relay R6 open to release the plug gripper cylinder 122 so as to drop a plug from the plug gripper 120 onto the conveyor 96.

X

Once the first cycle has progressed to the extent discussed, the operation of the apparatus is thereafter automatically actuated due to the presence of the parallel connected pipe-actuated switch PLS11 referred to in step I which is mounted adjacent to the prealignment stop 74. That is to say, the flipper plates 24 perform a kick-out, kick-in operation and shortly, the roll drive starts fast in the forward direction due to the switch PLS11 being actuated by a pipe taking the prealigned position ready for kick-out.

The cycle is then repeated.

Figure 8:
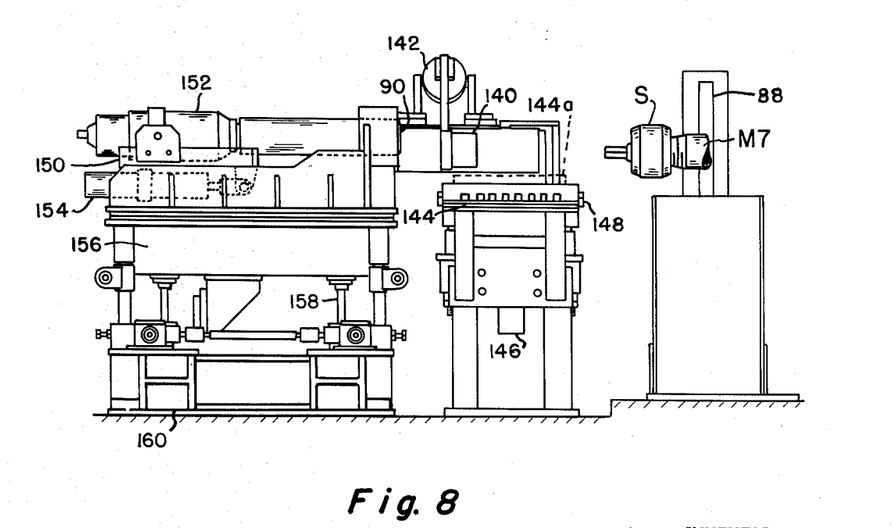
FIGURES 8 and 9 show the cap saddle elevator stand in side elevation and in end elevation respectively as viewed in the direction of lines VIII—VIII and IX—IX of FIGURE 1.
Figure 9:
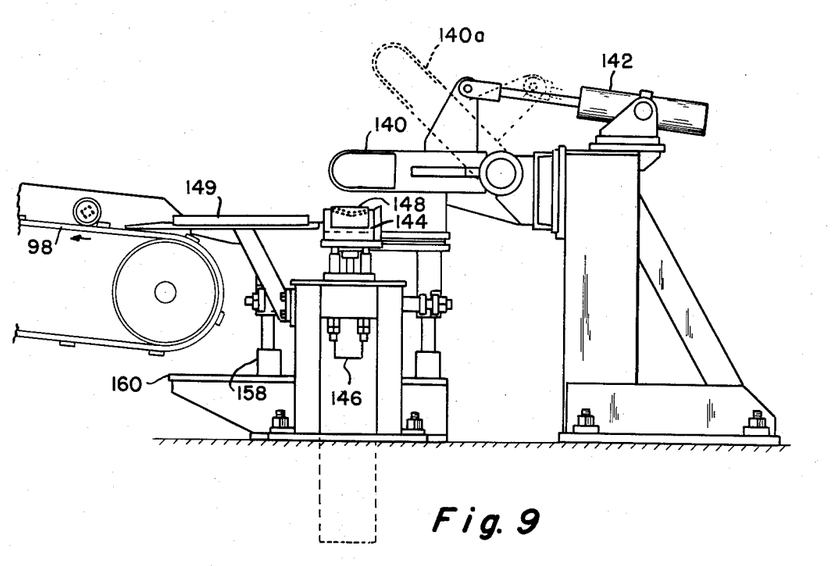
Figure 10:
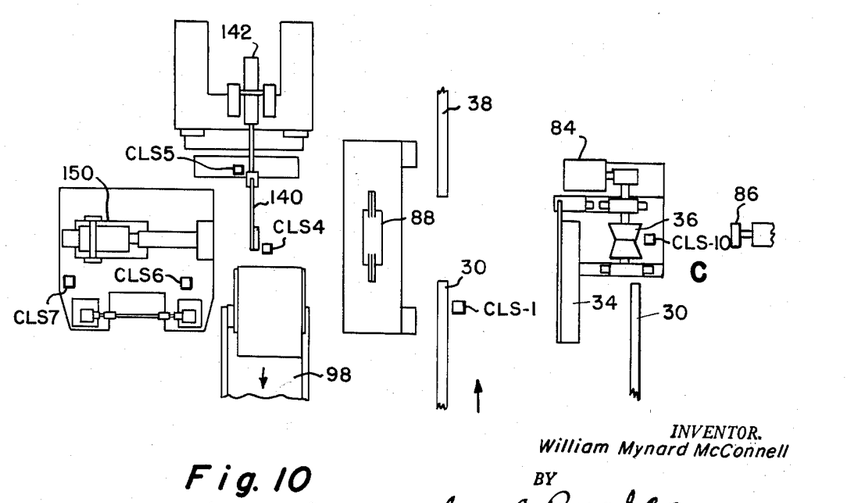
FIGURE 10 is a fragmentary view similar to FIGURE 1 but showing the location of various limit switches at the cap screw-off mechanism station.

In FIGURES 8, 9 and 10, a pipe stop 140 is pivoted into the solid line position in line with the roll stands C (FIGURE 10) by an air operated stop cylinder 142 which upon reverse action returns the stop to the unpivoted position shown by the dotted lines 140a in FIGURE 9. It is thus operative to stop an oncoming pipe member having the position M7 (FIGURE 2 on the roll stand C) at a point with its screw-on cap S precisely above a cap elevator saddle 144 which is vertically movable into an elevated position shown in the dotted lines 144a in FIGURE 8 and shown in solid lines in FIGURE 9. A saddle elevator cylinder 146 is connected to the saddle 144 for this purpose. A stop 148 comprising a flat plate bolted onto the end of the saddle holds a pipe cap axially fast but accommodates relative rotation thereof for unscrewing while the pipe member is clamped in the adjacent gripper 88.

Once unscrewed, a cap S is forthwith lowered by the elevator saddle 144 so as to transfer onto a set of conveyor-feeding skids 149 which feed each cap to the belt conveyor 98 for reuse.

A cap shank tool 90 (FIGURE 8) is supported on a slide carriage 150 in an assembly with an impact wrench 152 located on the carriage and coupled to the tool 90. A cylinder 154 is connected between the slide carriage 150 and a fixed point on the platform 156 of a tool stand to reciprocate the tool 90 toward and from the plug member S. A screw jack mechanism 158 supports the platform 156 for vertical adjustment with respect to a base 160 of the tool stand in order for the tool to accommodate to different diameters of pipe.

The screw-off apparatus of FIGURES 8, 9 and 10 comprises various limit switches for controlling the different operations. Their locations and functions are noted immediately following and thereafter a brief description of the sequential operation will be given.

*Limit switch CLS1.*—This switch is located in the bed of the skids 30 and serves to prepare the flipper plates 34 on the roll stands C for a kick-in kick-out operation.

*Limit switches CLS4 and CLS5.*—These switches are local switches for the stop 140. The switch CLS4 is carried by that stop so that, when the latter is pivoted for pipe stop engagement, the switch CLS4 will be actuated as soon as a pipe strikes the stop. The switch CLS5 is closed when the stop 140 is returned to unpivoted position but reopens each time the stop cylinder 142 pivots the stop 140 into pipe stopping position.

*Limit switches CLS6 and CLS7.*—These switches are operatively disposed adjacent the slide carriage 150 (FIGURE 10). They sense the positions of this carriage, the switch CLS6 being at a fixed point in the path of the carriage and the switch CLS7 being carried by the carriage 150.

*Limit switch CLS10.*—This switch is spring closed when it is uncovered by the trailing end of a pipe moving away from the stop 86 (FIGURE 10) and it is reopened by the leading end of that pipe as it approaches the stop 86 ready for kick-out.

Figure 11:
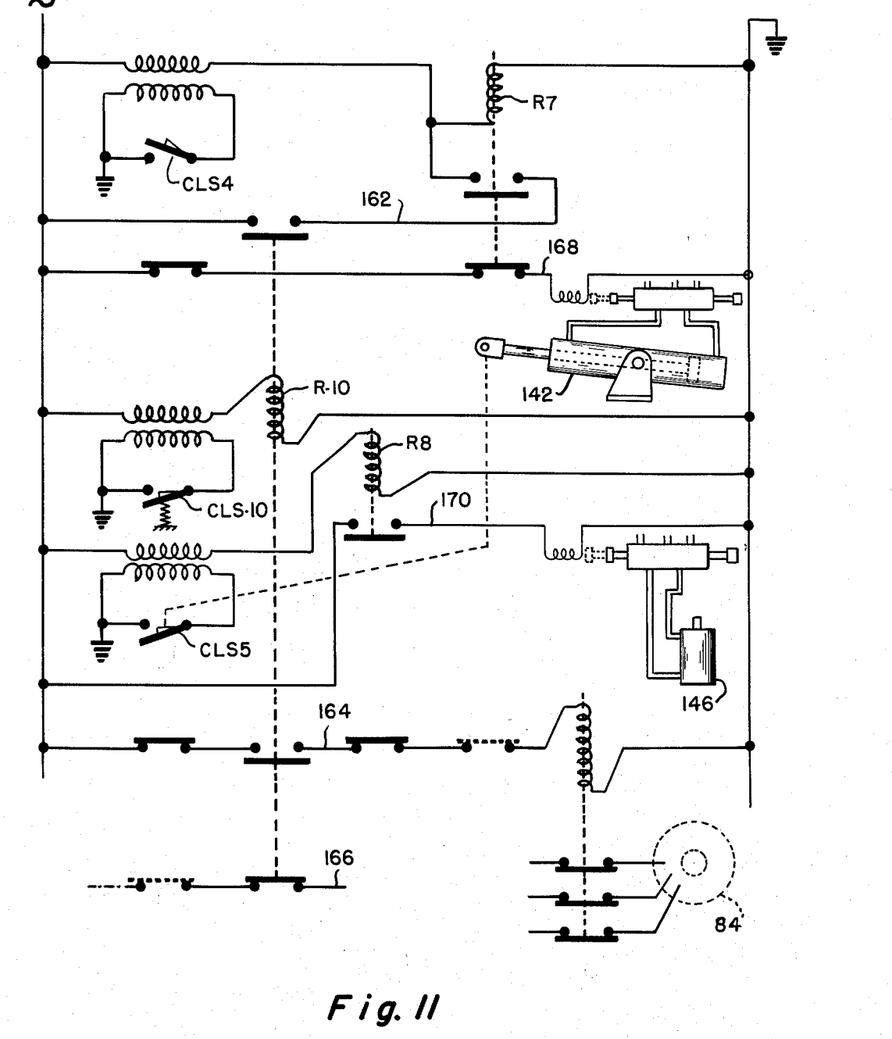
FIGURE 11 is a schematic diagram of a portion of the electrical operating circuit controlled by the limit switches of FIGURE 10.

In reference to schematic FIGURE 11, with FIGURE 10 to augment an understanding of same, the above switch CLS10 constitutes a static switch type of control so that when uncovered by the trailing end of a pipe to be uncapped on the roll stands C, it closes a circuit which, for preliminary purposes only, energizes a relay R10 (FIGURE 11). The relay R10 has three sets of contacts, the uppermost set of which prepares a holding circuit 162, the center set of which prepares a later closed solenoid circuit 164 which, when ultimately closed, operates reverse drive contacts for the roll drive motors 84, and the lowermost set of which opens an already open, kick-out circuit 166 which, due to a preceding operation, has already returned the flipper plates 34 on the roll stands C to their lowered position.

The cap on the end of the oncoming pipe member to be uncapped strikes the limit switch CLS4 on the pipe stop 140, thus energizing a relay R7 having two sets of contacts. The upper set of contacts thereof completes the holding circuit 162 for the relay R7 whereas the lower set of contacts thereof opens the energizing circuit 168 for the stop cylinder 142 causing the stop to be returned to the unpivoted position.

The return of the stop cylinder closes the switch CLS5 (FIGURE 11) energizing a relay R8. The relay R8 has contacts which energize an up circuit 170 for the saddle elevator cylinder 146, thus bringing the saddle 144 (FIGURE 9) and the cap stop 148 thereon into their operatively engaged position with the cap on the pipe member.

From this point on, the pipe member M can be immobilized by the cap S because, irrespective of the action of the pipe gripper 88, the pipe member M cannot move endwise towards the stop 86 so as to actuate the switch CLS10 again, until the cap S becomes completely unthreaded from the pipe member. If not completely unthreaded, the cap stop 148 prevents the cap and the pipe from moving by reason of firm engagement with the cap.

When the cap S is successfully removed from the pipe member M, the latter moves endwise on the roll stands C towards the prealignment stop 86 so as to cover the switch CLS10, thus deenergizing the relay R10 (FIGURE 11). The uppermost contacts of the relay R10 drop open the holding circuit 162, thus the deenergizing relay R7 and reenergizing the stop pivot circuit 168; the stop cylinder 142 therefor pivots the stop into its operative position at the same time opening the switch CLS5. Then and only then can the relay R8 deenergize to open the circuit 170 so as to deenergize the cap elevator cylinder 146 and allow the saddle to lower with the cap S.

The middle set of contacts of the relay R10 opens the solenoid circuit 164 (which has meantime been closed elsewhere) so as to open the reverse drive contacts referred to and stop the roll drive motors 84. The lowermost set of contacts of the relay R10 completes the kickout circuit 166 (which has meantime been prepared) so that the apparatus kicks out the uncapped pipe member and substitutes a capped member requiring uncapping.

The electrical circuits including time delay circuits which operate other cylinders of the apparatus of FIGURES 8–10 inclusive in response to actuation of the limit switches are well known in the art. Their operation will, it is believed, be apparent and so will the full operation of the roll drive motors 84 and the impact wrench 152, particularly from a consideration of the first embodiment of FIGURES 4–7.

It will be appreciated from the foregoing that the threads 44 on the respective ends of the pipe member M of FIGURE 3 are largely if not altogether relieved from pressure due to the weight of the plug member P and the cap member S while being unscrewed from the pipe member M. The automatic plug shank gripper 120 and elevator saddle 144 insure that the rapid unscrewing is accomplished automatically without binding in the threads or spoiling of the threads. The consolidation of the prealignment stops with an actual operating station in each case obviates special prealignment stations at different points and yet insures accurate prealignment in moving from station to station, as will be evident. Therefore, each station of the tester can be designed in particular relationship to the preceding station with no chance of the pipe members hanging over or creating mechanical interference with the structure provided at either end of the next station.

It is apparent that the unplugging mechanisms are operating on noncorresponding ends of two pipe members simultaneously and then prealigning such members substantially simultaneously, thus effecting an overlapping operation affording material time savings.

Variations within the spirit and scope of the invention described are equally comprehended by the foregoing descriptions.

I claim:
1. In treating apparatus for pipe members which have been pre-plugged with test closure members at the ends, and including stands arranged in alignment in a row extending lengthwise of the apparatus, combined operating and handling stations spaced apart from one another laterally of the row and including a plurality of automatic unplugging mechanism stations in which the pipe members are automatically operated on at one end of each and for purposes of which the pipe members are moved on the stands to predetermined positions endwise, said stands presenting a line of pipe support structures for supporting the pipe members, an individual gripper aligned with each of said pipe support structure lines for clamping a pipe member axially fast and also fast against rotation to enable the closure member to be removed, the mechanism at one of said automatic unplugging mechanism stations comprising a closure member support supporting said closure member for rotation by tool but holding it axially fast, preventing endwise withdrawal of the pipe member without complete removal of the closure member therefrom, a rotatable tool to unplug the pipe member and adapted to be power driven, and operating means individually connected to said gripper, to said pipe support structures, and to said closure member support at said station respectively, whereby upon completion of removal of said closure member by said tool, operation of one means unclamps said gripper from said pipe member, operation of another means withdraws said pipe member axially on said pipe support structures, and operation of the other means withdraws the support supporting said closure member.

2. In pipe testing apparatus for subjecting a pipe to internal hydraulic pressures, said pipe having been plugged with test closure members at its ends prior to testing, each of said test closure members including a substantially heavy body portion and a shank attached thereto and extending axially and rearwardly thereof, said shank having a smaller diameter than said body portion, said apparatus having a test station at which said pipe is subjected to said pressures, the invention comprising stands arranged in alignment in a row extending lengthwise of said apparatus, first and second automatic unplugging mechanism stations in which said pipe is automatically operated upon at each end for removal of said closure members, said first and second unplugging stations being laterally of and on opposite sides of said row and being on the exit side of said test station, said stands conveying said pipe endwise to and from said first and second unplugging stations, each of said first and second unplugging stations having a fixed gripper engageable with said pipe adjacent one end and a rotatively power driven tool means engageable with said shank of the closure member for rotating same to unplug said end of said pipe, tool reciprocating means connected to said tool means for moving same between closure member driving and retracted positions and drive position responsive control means connected to said tool reciprocating means operative if said tool is temporarily blocked due to faulty registration with a closure member, from following through to its seated drive position therewith, for repetitively recycling said tool reciprocating means to repeat the reciprocations until but no later than a drive position is successfully attained.

3. In a pipe testing apparatus for subjecting a pipe to internal hydraulic pressures, said pipe having been plugged with test closure members at its ends prior to testing, each of said test closure members including a substantially heavy body portion and a shank attached thereto and extending axially and rearwardly thereof, said shank having a smaller diameter than said body portion, said apparatus having a test station at which said pipe is subjected to said pressures, the invention comprising stands arranged in alignment in a row extending lengthwise of said apparatus, first and second automatic unplugging mechanism stations in which said pipe is automatically operated upon at each end for removal of said closure members, said first and second unplugging stations being laterally of and on opposite sides of said row and being on the exit side of said test station, said stands conveying said pipe endwise to and from said first and second unplugging stations, each of said first and second unplugging stations having a fixed gripper engageable with said pipe adjacent one end and a rotatively power driven tool means engageable with said shank of the closure member for rotating same to unplug said end of said pipe, at least one of said unplugging stations having a movable closure member contacting means adjacent said tool means and disposed to support said closure member for rotation thereof when being unplugged from said pipe.

4. The movable closure member contact means of claim 3 characterized by motor means connected thereto to provide movement thereof in a path substantially at right angles to endwise movement of said pipe so that when released from said pipe, said closure member is withdrawn at substantially right angles to the direction of withdrawal of said pipe and a closure member stop mounted upon said contacting means in a position to so engage said closure member that withdrawal movement of said pipe in an endwise direction is prevented unless said closure member is fully released therefrom.

5. The invention of claim 3 characterized by tool reciprocating means connected to said tool means for moving same between closure member driving and retracted positions and by drive position responsive control means connected to said tool reciprocating means operative if said tool is temporarily blocked due to faulty registration with a closure member, from following through to its seated drive position therewith, for repetitively recycling said tool reciprocating means to repeat the reciprocations until but no later than a drive position is successfully attained.

6. The invention of claim 5 characterized by its movable closure member contacting means having a motor means connected thereto to provide movement in a path substantially at right angles to endwise movement of said pipe so that when released from said pipe, said closure member is withdrawn at substantially right angles to the direction of withdrawal of said pipe and a closure member stop mounted upon said contacting means in a position to so engage said closure member that withdrawal movement of said pipe in an endwise direction is prevented unless said closure member is fully released therefrom.

7. In pipe testing apparatus for subjecting a pipe to internal hydraulic pressures, said pipe having been plugged with test closure members at its ends prior to testing, each of said test closure members including a substantially heavy body portion and a shank attached thereto and extending axially and rearwardly thereof, said shank having a smaller diameter than said body portion, said apparatus having a test station at which said pipe is subjected to said pressures, the invention comprising stands arranged in alignment in a row extending lengthwise of said apparatus, first and second automatic unplugging mechanism stations in which said pipe is automatically operated upon at each end for removal of said closure members, said first and second unplugging stations being laterally of and on opposite sides of said row and being on the exit side of said test station, said stands conveying said pipe endwise to and from said first and second unplugging stations, each of said first and second unplugging stations having a tool engageable with said shank of said closure member to unplug same from the end of the pipe and mounted to be power driven, an impact wrench in power driving relation with said tool for rotating same in engagement with said shank, fixed support means adjacent said tool and engageable with said pipe to nonrotatively hold same, movable closure member contacting means adjacent said tool and disposed to support said closure member for rotation thereof when being unplugged from said pipe.

8. The invention of claim 7 characterized by at least one of said unplugging stations having a carriage common to said tool, said impact wrench and said movable closure member contacting means for moving same in unison axially of said unplugging station, said tool and said impact wrench being coupled to one another and capable of conjoint limited travel relative to said movable closure member engaging means.

9. The invention of claim 7 characterized by tool reciprocating means connected to said tool for moving same between closure member driving and retracted positions and drive position responsive control means connected to said tool reciprocating means operative if said tool is temporarily blocked due to faulty registration with a closure member, from following through to its seated drive position therewith for repetitively recycling said tool reciprocating means to repeat the reciprocations until but no later than a drive position is successfully attained.

10. The invention of claim 7 characterized by one of said movable closure member contact means being connected to a motor means which provides movement thereof in a path substantially at right angles to endwise movement of said pipe so that when released from said pipe, said closure member is withdrawn at substantially right angles to the direction of withdrawal of said pipe and a closure member stop mounted upon said contacting means in a position to so engage said closure member that withdrawal movement of said pipe in an endwise direction is prevented unless said closure member is fully released therefrom.

11. The invention of claim 9 characterized by one of said movable closure member contact means being connected to a motor means which provides movement thereof in a path substantially at right angles to endwise movement of said pipe so that when released from said pipe, said closure member is withdrawn at substantially right angles to the direction of withdrawal of said pipe and a closure member stop mounted upon said contacting means in a position to so engage said closure member that withdrawal movement of said pipe in an endwise direction is prevented unless said closure member is fully released therefrom.

12. In pipe apparatus for removing a test closure member from an end of pipe, the invention comprising a rotatively power driven tool engageable with said closure member for rotating same to unplug said end of said pipe, tool reciprocating means connected to said tool for moving same between closure member driving and retracted positions and drive position responsive control means connected to said tool reciprocating means operative if said tool is temporarily blocked due to faulty registration with a closure member, from following through to its seated drive position therewith, for repetitively recycling said tool reciprocating means to repeat the reciprocations until but no later than a drive position is successfully attained.

13. In pipe apparatus for removing a test closure member from an end of a pipe at an automatic unplugging mechanism station, the invention comprising a rotatively power driven tool engageable with said closure member for rotating same to unplug said end of said pipe, tool reciprocating means connected to said tool for moving same between closure member driving and retracted positions and drive position responsive control means connected to said tool reciprocating means operative if said tool is temporarily blocked due to faulty registration with a closure member, from following through to its seated drive position therewith, for repetitively recycling said tool reciprocating means to repeat the reciprocations until but no later than a drive position is successfully attained, and a movable closure member contacting means adjacent said tool and disposed to support said closure member for rotation thereof when being unplugged from said pipe.

14. The movable closure member contacting means of claim 13 characterized by motor means connected thereto to provide movement in a path substantially at right angles to endwise movement of said pipe so that when released from said pipe, said closure member is withdrawn at substantially right angles to the direction of withdrawal of said pipe and a closure member stop mounted upon said contacting means in a position to so engage said closure member that withdrawal movement of said pipe in an endwise direction is prevented unless said closure member is fully released therefrom.

15. The invention of claim 13 characterized by an impact wrench in power driving relation with said tool.

16. In pipe apparatus for removing a test closure member from an end of a pipe at an automatic unplugging mechanism station, said closure member including a substantially heavy body portion and a shank attached thereto and extending axially and rearwardly therefrom, said shank having a smaller diameter than said body portion, the invention comprising a rotatable tool engageable with said shank for rotating said closure member to unplug said end of said pipe and a movable closure member contacting means adjacent said tool and disposed to support said closure member for rotation thereof when being unplugged from said pipe.

17. The invention of claim 16 characterized by an impact wrench drivingly connected to said tool.

18. The movable closure contacting means of claim 16 characterized by motor means connected thereto to provide movement thereof in a path substantially at right angles to endwise movement of said pipe so that when released from said pipe, said closure member is withdrawn at substantially right angles to the direction of withdrawal of said pipe and a closure member stop mounted upon said contacting means in a position to so engage said closure member that withdrawal movement of said pipe in an endwise direction is prevented unless said closure member is fully released therefrom.

References Cited in the file of this patent
UNITED STATES PATENTS

| | | |
|---|---|---|
| 2,678,576 | Thompson | May 18, 1954 |
| 2,756,490 | Sawdey | July 31, 1956 |
| 2,947,165 | Kirchner et al. | Aug. 2, 1960 |
| 3,035,336 | McConnell | May 22, 1962 |